J. P. Howell.
Upsetting Tires.
No 54,165.    Patented Apr. 24, 18—
Fig. 1.    Fig. 2.    Fig. 3.
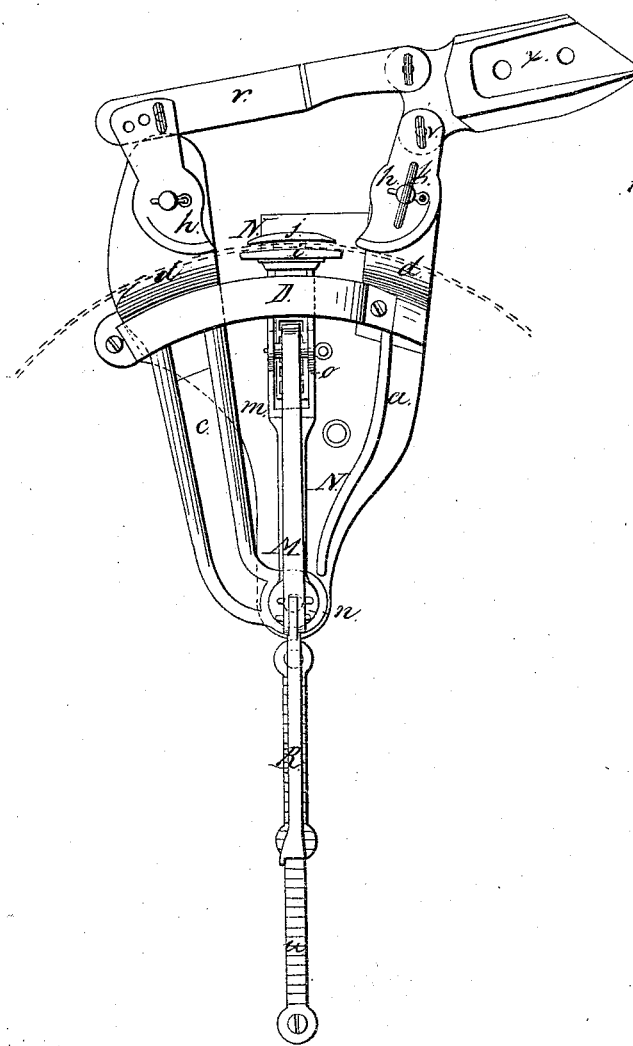
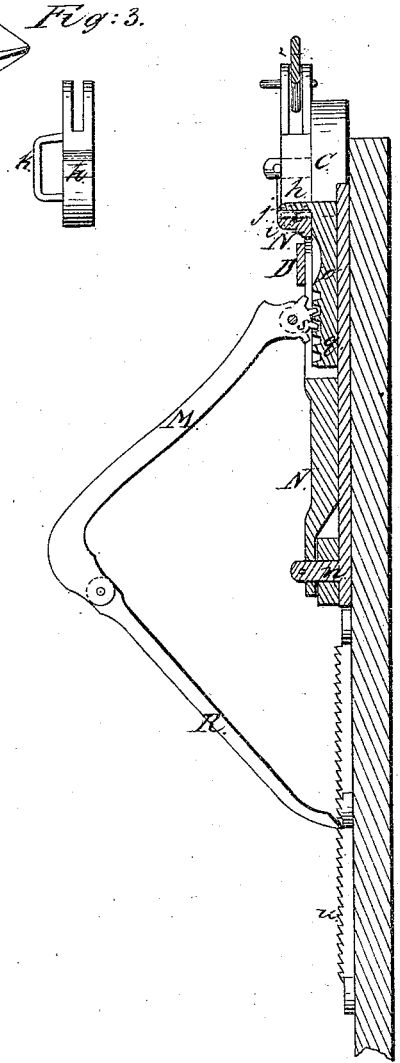
Witnesses;    Invent'
J. W. Comby    J. P. Howell
A. LeClerc

UNITED STATES PATENT OFFICE.

JAMES P. HOWELL, OF NEW YORK, N. Y.

IMPROVEMENT IN TIRE-SHRINKERS.

Specification forming part of Letters Patent No. 54,165, dated April 24, 1866.

*To all whom it may concern:*

Be it known that I, JAMES P. HOWELL, of the city, county, and State of New York, have invented a new and Improved Machine for Shrinking Tires; and I do hereby declare that the following is a full, clear, and exact description of the same, reference being had to the accompanying drawings, forming a part of this specification, in which—

Figure 1 is a front elevation of the machine. Fig. 2 is a vertical section of the same at right angles to Fig. 1. Fig. 3 is a side view of a portion of the machine.

The object of this invention is to obtain an apparatus for shrinking tires which can be conveniently operated by one person, and which will perform its work without bending the tire from its proper shape.

In order to enable those skilled in the art to understand and construct my invention, I will proceed to describe it with reference to the drawings.

The apparatus is constructed mainly of cast-iron, and is intended to be placed in an upright position when used, being firmly secured to a suitable support, A, as shown in Fig. 2.

$a$ represents a stationary arm, which is cast in one piece with the bed or supporting plate $m$, and to the lower end of which, at $n$, is pivoted the swinging arm $c$. Each of these arms $a$ and $c$ is provided near its upper end with a jaw or shoulder, $d$, and also with a pivoted eccentric, $h$. The upper surfaces of these shoulders $d$ form arcs of a circle the center of which is the pivot $n$ of the swinging arm $c$, as shown in Fig. 1, and, acting in conjunction with the eccentrics $h$, form clamps which hold the tire during the operation of shrinking, as will be presently explained.

The lever $x$ is pivoted to the eccentric of the stationary arm $a$ at $v$, and is connected with the upper end of the eccentric $h$ of the swinging arm $c$ by means of the rod $r$, as represented in Fig. 1. The eccentric of the stationary arm $a$ is provided with a handle, $k$, (shown clearly in Fig. 3,) by means of which it is operated independently of the lever $x$ to clamp the tire when first placed in the machine.

Between the two jaws $c$ and $a$, and pivoted on the same pivot with the swinging arm $c$, is the vise N, which is designed to prevent the tire from bending out of shape during the operation of shrinking, and which consists of the pivoted swinging jaw $i$, having its upper surface curved in an arc concentric with that of the jaws $d$ $d$, and of a sliding jaw, $j$, the shank $o$ of which slides in a suitable cavity in the stem of the jaw $i$, and which is operated by the lever M through the agency of the sector $s$ and rack $q$. At the outer end of the lever M is pivoted a pawl, R, which operates, in connection with the ratchet $u$, to retain the sliding jaw $j$ at any desired distance from the jaw $i$.

D is a clasp screwed upon the arm $a$ and bed-plate $m$ for the purpose of keeping the arm $c$ and vise N in place.

Such being the construction of the machine, its operation will be as follows: A sufficient portion of the tire being heated to a suitable degree, the eccentrics are moved away from the jaws $d$ $d$ in order to admit the tire, which is laid upon the said jaws $d$ $d$ and upon the jaw $i$ of the vise N. The eccentric of the stationary arm $a$ is brought in contact with the tire by turning the same by means of the handle $k$. The sliding jaw $j$ is then brought down upon the tire by elevating the lever M, and is retained in place by the pawl R, the lower end of which is placed upon one of the teeth of the ratchet $q$. This being done, the lever $x$ is brought downward, and, acting through the rod $r$, brings the eccentric of the swinging arm $c$ in contact with the tire, thus firmly clasping it between the said eccentric and the jaw $d$ of the said swinging arm $c$. This, of course, prevents the eccentric from turning farther, and the motion of the lever $x$, being continued, causes the swinging arm $c$ to approach the stationary arm $a$, which thus forces the heated metal in upon itself, thus contracting the diameter of the tire.

The action of the lever, it will be seen, causes the eccentrics $h$ to firmly clamp the tire against the jaws $d$ $d$ during the operation, and that the vise N prevents the tire from bending out of place.

It will furthermore be noticed that this vise N, being pivoted on the same pivot as the swinging arm $c$, and having the upper surface of its jaw $i$ on an arc concentric with those described by the jaws $d\ d$, causes the tire to retain its circular form by clamping the same in proper shape during the operation of shrinking, and that this result is the same whatever point the jaws of the vise may occupy between the arms $a$ and $c$.

It will also be observed that by retaining the sliding jaw of the vise in place, as shown, the machine may be operated by one person without assistance.

Having thus described my said invention, what I claim as new, and desire to secure by Letters Patent, is—

1. The vise N, when supported on a pivot or its equivalent, to allow it a circumferential motion in direction of the motion of the jaw $d$ of the swinging arm $c$, substantially as set forth.

2. The bed-plate $m$, cast in one piece with the stationary arm $d$, and used in combination with the swinging arm $c$, for the purpose and in the manner substantially as herein set forth and shown.

3. The combination of the pawl R and ratchet $u$ with the lever M, for operating and holding the movable jaw $j$ of the vise, substantially as and for the purposes set forth.

J. P. HOWELL.

Witnesses:
HENRY T. BROWN,
J. W. COOMBS.